(12) United States Patent
White et al.

(10) Patent No.: US 9,670,949 B1
(45) Date of Patent: Jun. 6, 2017

(54) KEYHOLE WELD-DOWN FASTENER BASE

(71) Applicant: James C. White Company, Inc., Greenville, SC (US)

(72) Inventors: Thomas C. White, Greenville, SC (US); Raymond Edward Parent, Greenville, SC (US)

(73) Assignee: James C. White Company, Inc., Greenville, SC (US)

( * ) Notice: Subject to any disclaimer, the term of this patent is extended or adjusted under 35 U.S.C. 154(b) by 137 days.

(21) Appl. No.: 14/816,428

(22) Filed: Aug. 3, 2015

(51) Int. Cl.
| | | |
|---|---|---|
| F16L 3/22 | (2006.01) | |
| F16L 3/223 | (2006.01) | |
| F16B 2/02 | (2006.01) | |
| F16B 9/02 | (2006.01) | |
| F16B 2/06 | (2006.01) | |

(52) U.S. Cl.
CPC .............. *F16B 9/026* (2013.01); *F16B 2/065* (2013.01); *F16L 3/2235* (2013.01)

(58) Field of Classification Search
None
See application file for complete search history.

(56) References Cited

U.S. PATENT DOCUMENTS

| | | | | |
|---|---|---|---|---|
| 3,146,982 A | * | 9/1964 | Budnick | ................. F16L 3/237 24/135 R |
| 3,199,566 A | | 8/1965 | Dyka | |
| 3,856,244 A | * | 12/1974 | Menshen | ................. F16L 3/237 248/67.5 |
| 4,224,721 A | * | 9/1980 | Ohlson | ................. F16B 7/0433 24/376 |
| 4,423,537 A | | 1/1984 | Salice | |
| 4,473,316 A | * | 9/1984 | Welch | ..................... F16B 12/22 248/222.41 |
| 5,548,939 A | | 8/1996 | Carmical | |
| 5,794,897 A | * | 8/1998 | Jobin | ..................... H02G 7/053 24/459 |
| 5,941,483 A | * | 8/1999 | Baginski | ................... F16L 3/22 248/68.1 |
| 5,992,802 A | * | 11/1999 | Campbell | ................ H02G 3/30 248/68.1 |
| 5,996,945 A | * | 12/1999 | Coles | .................... F16L 3/2235 24/16 R |
| 6,109,819 A | * | 8/2000 | Welch | .................. A47B 13/003 248/222.41 |

(Continued)

*Primary Examiner* — Joshua J Michener
*Assistant Examiner* — Kyle Walraed-Sullivan
(74) *Attorney, Agent, or Firm* — Nexsen Pruet, LLC; Michael A. Mann

(57) ABSTRACT

A weld-down base conforms to a surface to support other objects, such as cables, motors, water tanks, etc. The base has at least one keyhole shaped hole, with a first portion and a second portion. On the top side of the base, the first portion of each hole is large enough to pass the head of a bolt; the second portion is only large enough to pass the shaft of the bolt but not the head. However, the second portion is stepped near the exit side to be wider so that the bolt head can be inserted into the wider first portion and then slid laterally to the second portion where the step will hold the bolt in place with its threaded shaft extending from the base. The exposed bolt allows objects such as clamps, brackets, signs, lighting, fire extinguishers, hoses, instruments, and so on, to the supporting surface.

13 Claims, 12 Drawing Sheets

(56) References Cited

U.S. PATENT DOCUMENTS

| | | | |
|---|---|---|---|
| 6,173,926 B1* | 1/2001 | Elvegaard | F16L 3/1075 248/68.1 |
| 6,185,784 B1 | 2/2001 | Gamperle | |
| 6,308,921 B1* | 10/2001 | Borzucki | F16L 3/237 248/68.1 |
| 6,523,790 B2* | 2/2003 | Sentpali | F16L 55/035 248/68.1 |
| 6,536,982 B2* | 3/2003 | Gibbons | F16B 7/0433 403/391 |
| 7,083,479 B2 | 8/2006 | Muller et al. | |
| 7,484,698 B2* | 2/2009 | Budagher | F16L 3/11 174/40 R |
| 8,469,413 B2 | 6/2013 | Novajovsky et al. | |
| 9,038,968 B2* | 5/2015 | Hennon | F16L 3/1091 248/65 |
| 2001/0053478 A1* | 12/2001 | Kump | A45F 5/10 429/187 |
| 2005/0010227 A1 | 1/2005 | Paul | |
| 2010/0116278 A1* | 5/2010 | Wiberg | F16B 2/185 128/846 |
| 2010/0308184 A1* | 12/2010 | Hennon | F16L 3/222 248/74.1 |
| 2014/0224942 A1* | 8/2014 | Railsback | F16L 3/2235 248/68.1 |
| 2015/0369396 A1* | 12/2015 | Handa | E02F 9/00 248/65 |

\* cited by examiner

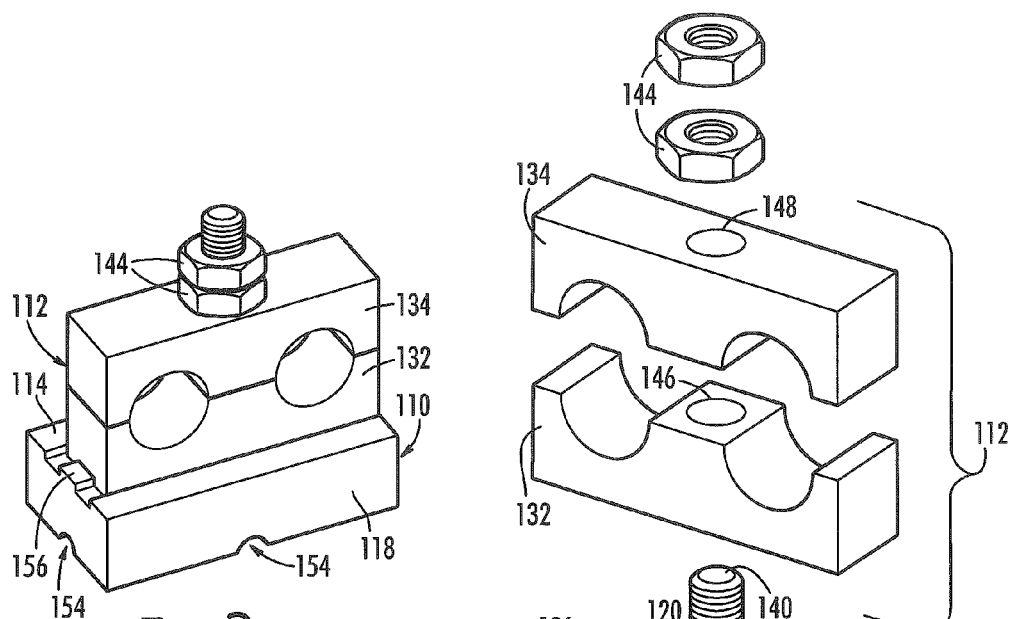
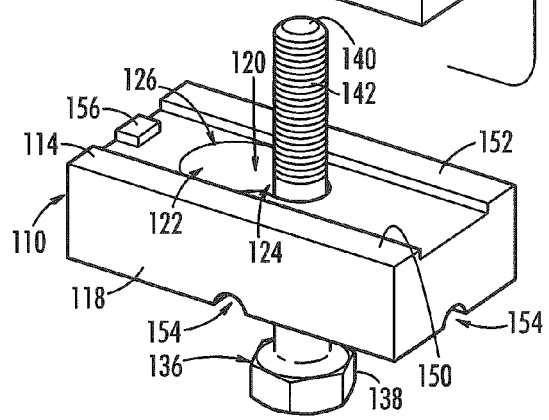
FIG. 3A
FIG. 3B

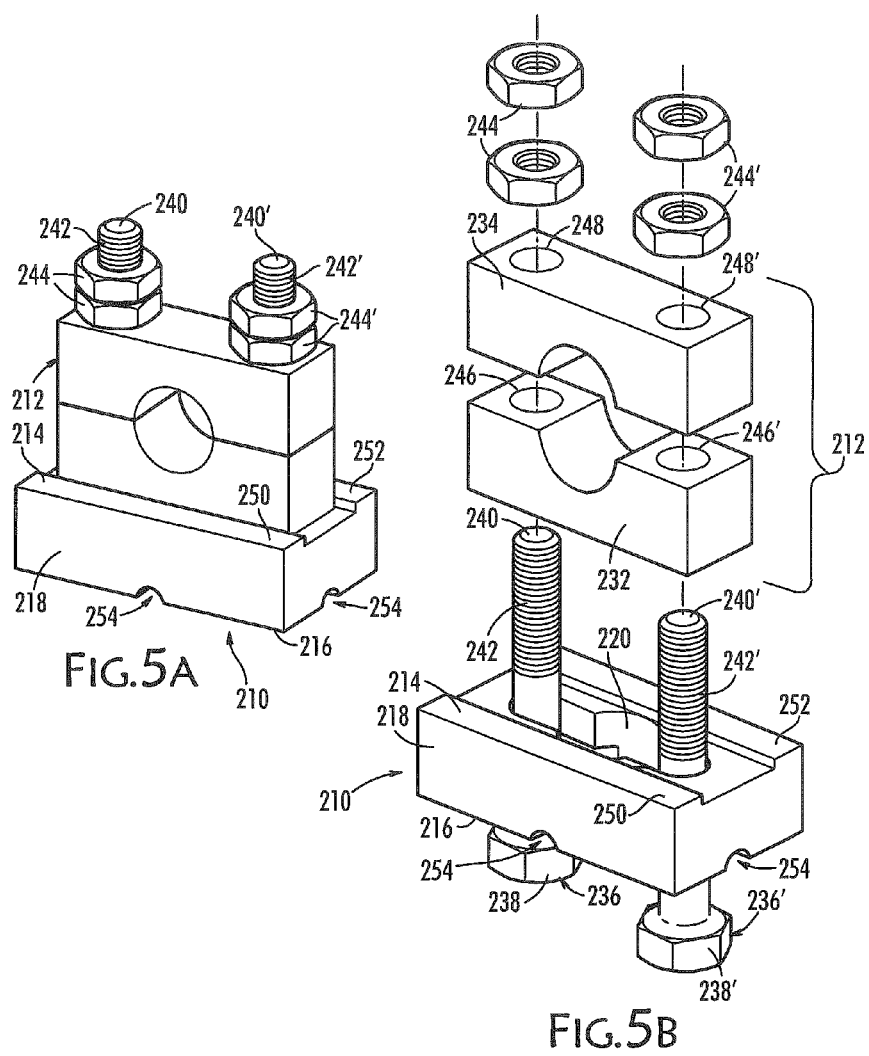

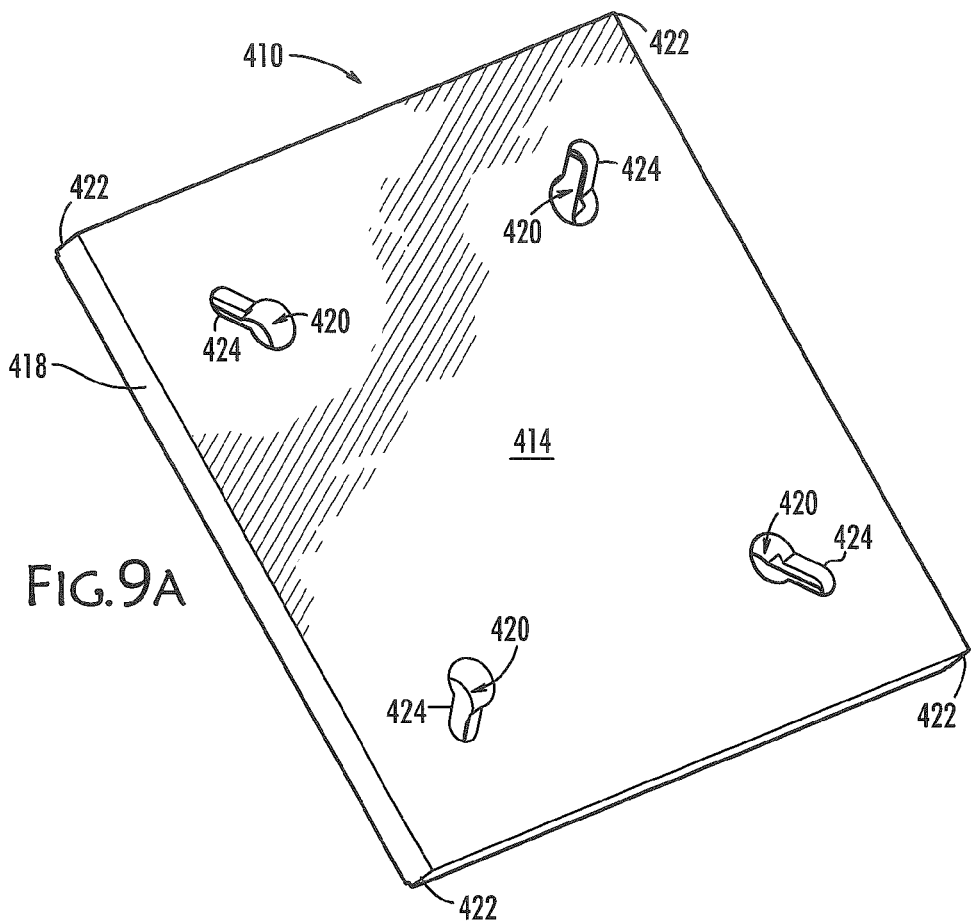

KEYHOLE WELD-DOWN FASTENER BASE

FIELD OF THE INVENTION

The invention relates generally to fasteners. In particular, the invention relates to fasteners that can be installed on surfaces of convenience for supporting objects from those surfaces.

BACKGROUND

In commercial and industrial facilities, it may be necessary to support objects above the ground. As examples of such objects, cable trays carrying conduit, piping, cables, wires, and the like, may be run from one location to another and should be elevated to prevent damage or injuries. Cable trays may not always be practical, especially when only one or two conduits, pipes, etc., are running between the same two points or ceilings are low. Under these circumstances, other, pre-existing structures that are conveniently between the origin and destination may provide surfaces that can support the conduits, pipes, etc.

Many other examples of such objects exist. Sensors, lighting, monitors, instruments, motors, mirrors, signs, and countless other objects used in various commercial and industrial locations and that may need to be attached to existing surfaces when convenient. These surfaces may be flat or curved but rarely have structures on them suitable for fastening or hanging objects.

Given the ad hoc nature of these surfaces, and the inevitable informality of using existing means such as clamps and brackets to secure objects to them, the results are often unsatisfactory, may take time to implement, and, especially if these surfaces are out-of-doors, may not be durable either.

A ready device that makes it possible to attach objects to surfaces of convenience and that provide good holding power and durability over time would be advantageous.

SUMMARY OF THE INVENTION

The present disclosure describes a new class of fastener bases from which one can be selected to weld to any of various surfaces of convenience and thereby provide support for objects. This fastener is a precision base that is permanently fastened to a surface but drain slots may be left open in the perimeter. The base is contoured to conform to the surface and its perimeter is fully available for welding to that surface. The base provides one or more adjustable threaded studs that can accommodate a variety of prior art brackets, clamps, instruments, and so on, that can mate to the object to be supported. These fastener bases are welded to the surface. Each has at least one key-hole configured to receive a bolt. The bolt may be put into position before or after the base is welded to the surface. The location of the bolt within the keyhole adjusts to accommodate the spacing of holes in an object to be mounted. The keyhole (or the plural keyholes in the base) communicates with drain channels on the opposing side of the base to shed rain water that might otherwise become trapped in the slots.

An aspect of the disclosure is a device for use in holding an object that comprises a base having a top surface, a bottom surface, sides, and a hole running from an entrance in the top surface of the base to an exit in the opposing, bottom surface. The hole has a keyhole shape with a first portion and a second portion in communication with the first portion. The second portion of the hole is narrower than the first portion at the entrance on the top surface of the base, but is wider at the exit of the base than the second portion was at the entrance because of a step increase in size of the second portion toward the exit. The first portion of the hole may be the same size at its exit as it is at its entrance. The keyhole shape is designed to retain fasteners such as hex head bolts, square head bolts, and T-slot nuts.

Another aspect of the disclosure is that the bottom surface has at least one channel formed in the bottom surface that extends from the hole to the sides of the base.

Yet another aspect of the invention is that the top surface may have opposing spaced-apart ridges with the hole between them to center the object over the hole. The top surface may also include a stop between the first portion of the hole and the nearest side of the base to limit longitudinal movement of the object.

An important aspect of the disclosure is that the bottom surface of the base may be shaped to conform to the surface to which it is to be welded, which surface may be flat or curved or otherwise shaped, for example.

Another aspect of the disclosure is that the device for supporting an object may include both the base and one or more bolts. Each bolt may have a threaded shaft and a head. The bolt head fits through the first portion of the entrance of the hole from the top surface but not through the second portion from the top surface; only the shaft fits through the second portion from the entrance side of the second portion. The head of the bolt may be received only part way into the second portion at the exit by sliding it laterally from the first portion and only when the head is near the exit of the hole in the base. The head of bolt may have a hexagonal, square, t-shape or other similar shape.

An important aspect of the invention is the step formed in the second portion of the hole between the entrance and the exit so that the head of the bolt may be received in the second portion only after it reaches the step so the step can hold it in place with respect to axial movement.

Another aspect of the disclosure is that there may be a third portion of the hole for a second bolt. The third portion, located with the first portion between it and the second portion, is also wider at its exit than at its entrance and is formed with a step inside the third portion of the hole to allow a bolt with its head inserted in the first portion to be slid laterally in the hole from the first portion to either the second portion or the third portion once the head of the bolt passes the steps in the second and third portions, respectively.

Still another aspect of the disclosure is that there may be two separate holes formed in the base for two separate keyhole-shaped holes, one for each of two bolts.

An important aspect of the invention is that the device may include the base, one or more bolts, a clamp configured to grip at least one object, and nuts to thread to the ends of the one or more bolt shafts to hold the assembled device together.

An advantage of the present welded base is that it may be welded to a convenient surface as a low-cost way to support an object without installing special supports when one is already conveniently in position. The present base provides threaded studs that are convenient for attaching a wide variety of objects and the studs do not need to be left in place if the object is removed; the studs slide laterally from the second portion of the keyhole to the first portion and then pull straight out. Studs can support a bracket especially since the threaded studs can be moved laterally to align with holes in a bracket. The welded base can be attached to a curved, flat, or otherwise shaped surface, and they may have channels to serve as "weep holes" for expelling water that gets into the holes if the base is installed out of doors or in a wash down area. Those familiar with construction will appreciate many other advantages from a careful reading of the Detail Description accompanied by the following drawings.

BRIEF DESCRIPTION OF THE DRAWINGS

Figures 1A, 1B:
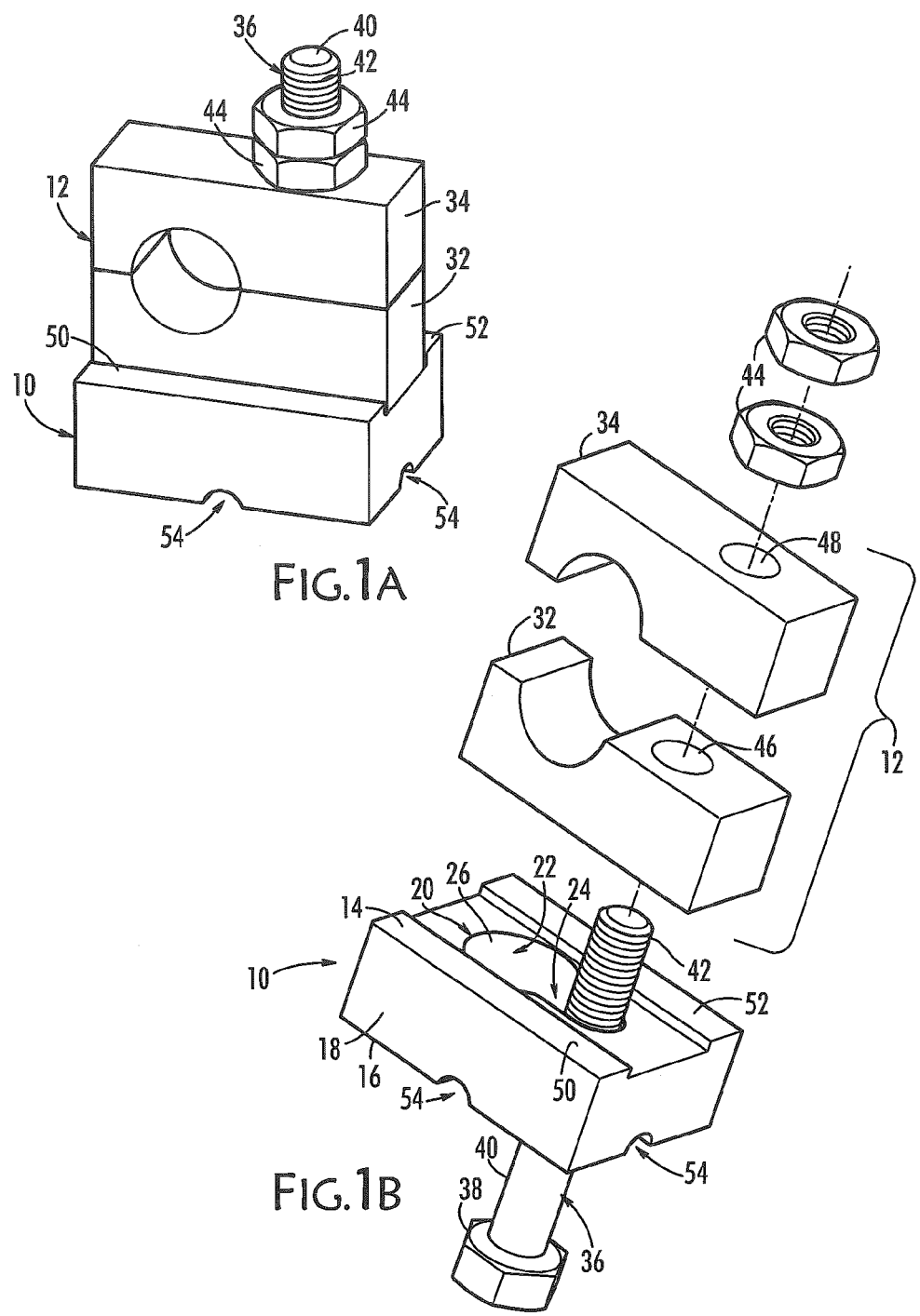
Figure 2A:
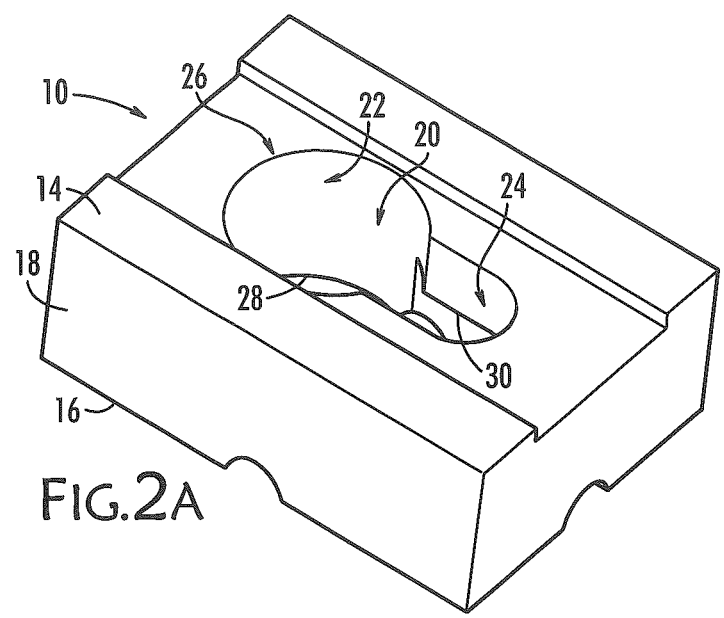
Figure 2B:
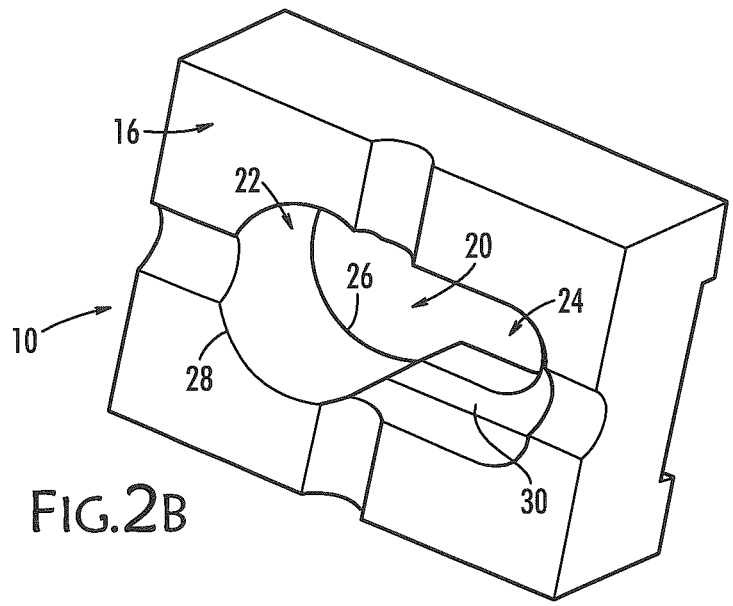
Figure 4A:
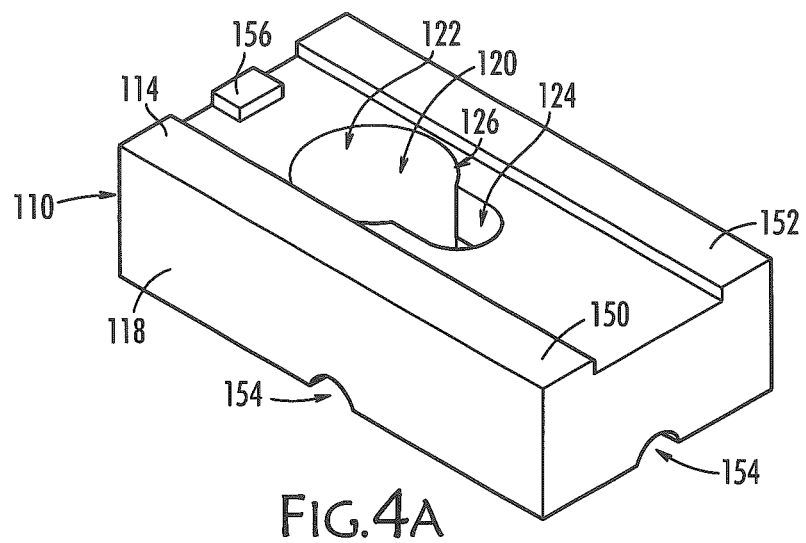
Figure 4B:
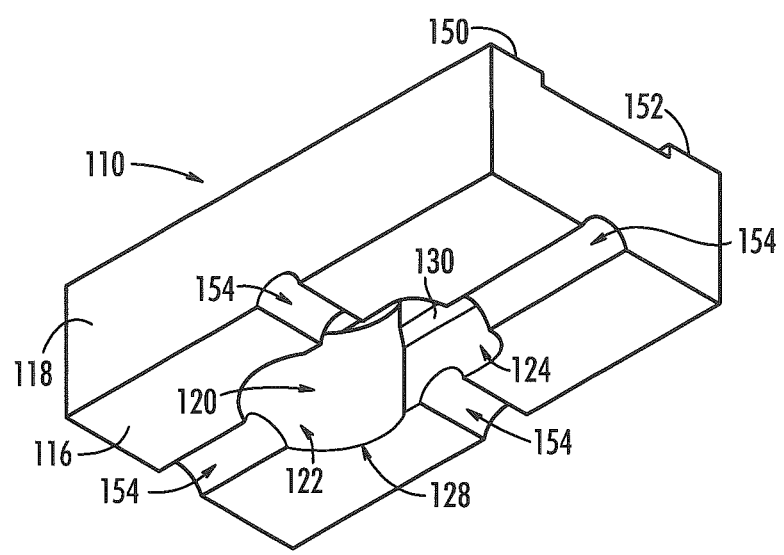
Figure 6A:
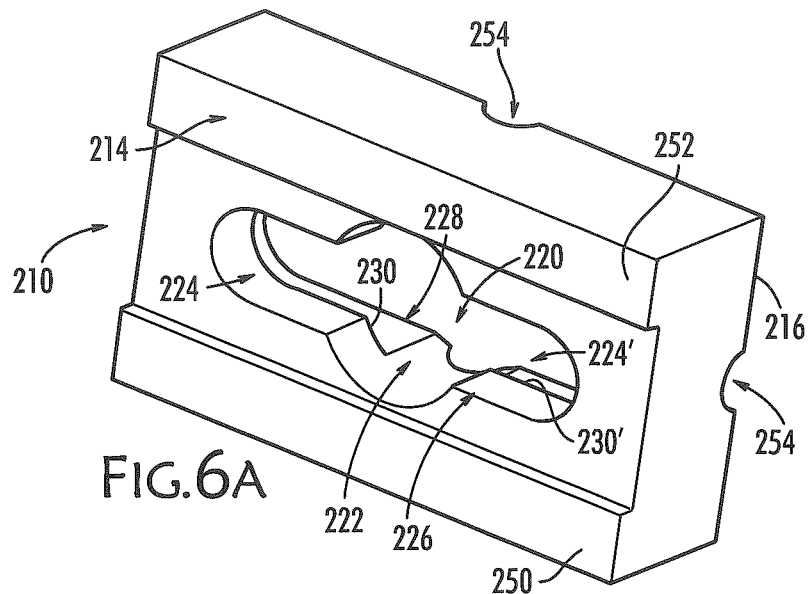
Figure 6B:
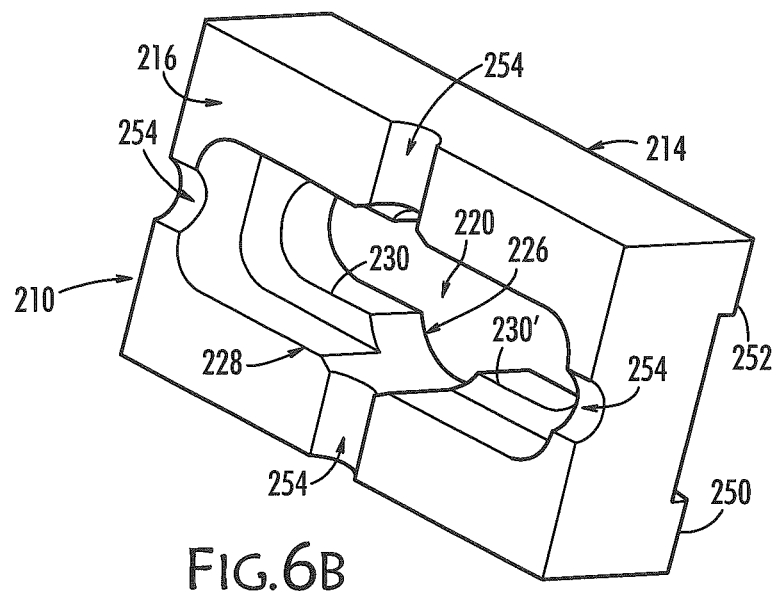
Figure 7:
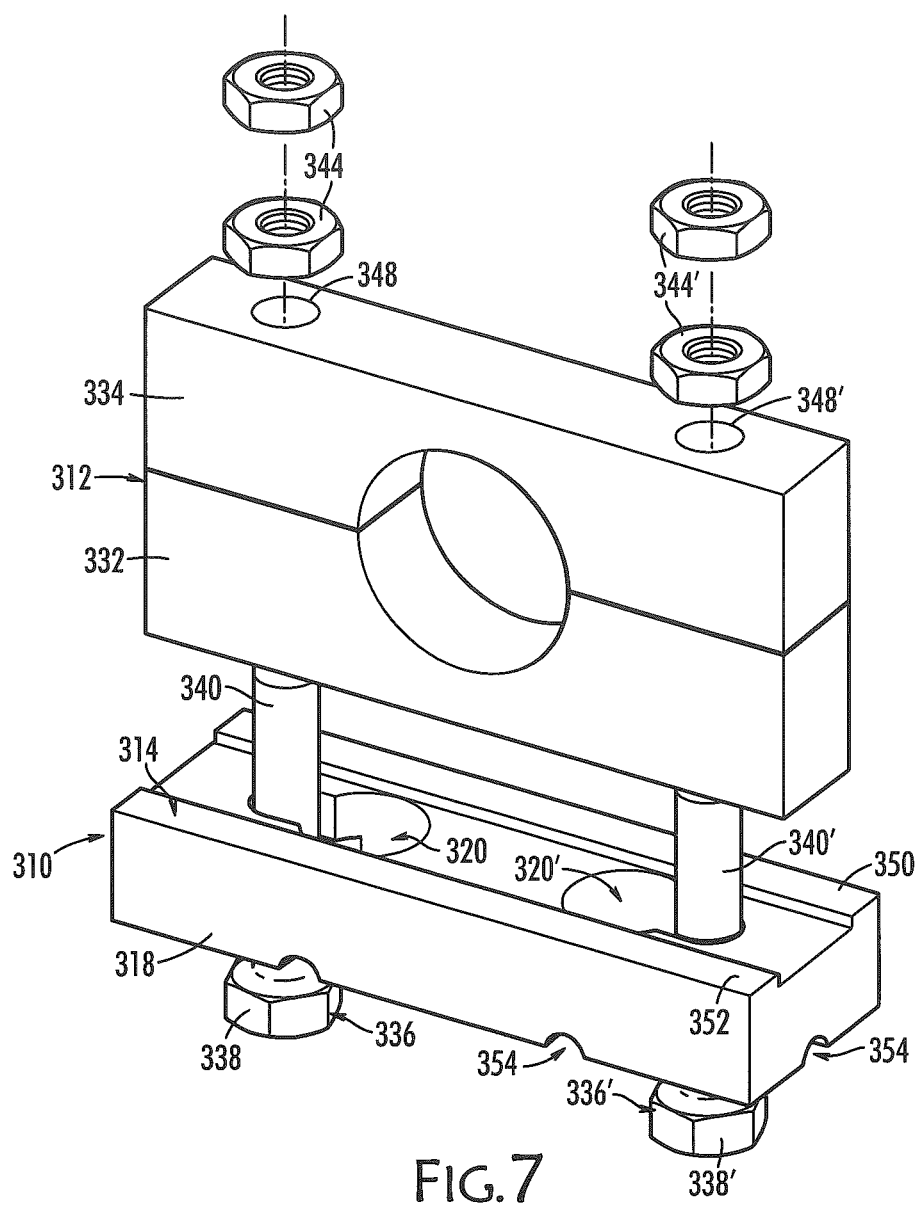
Figure 8A:
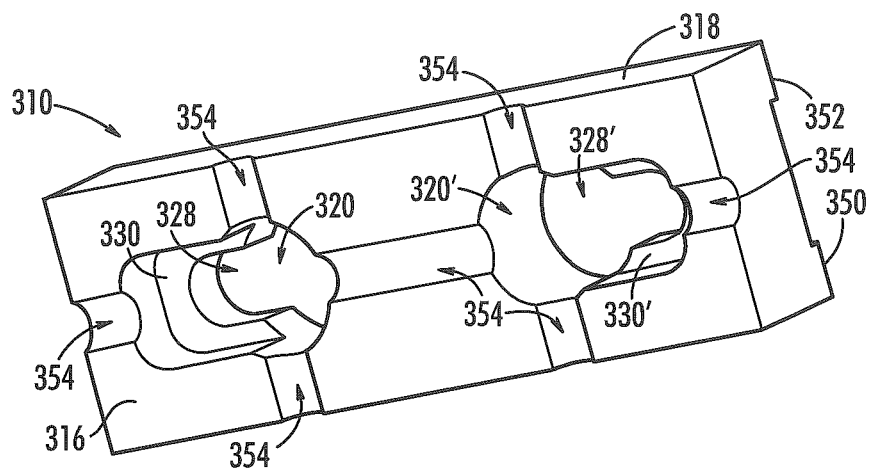
Figure 8B:
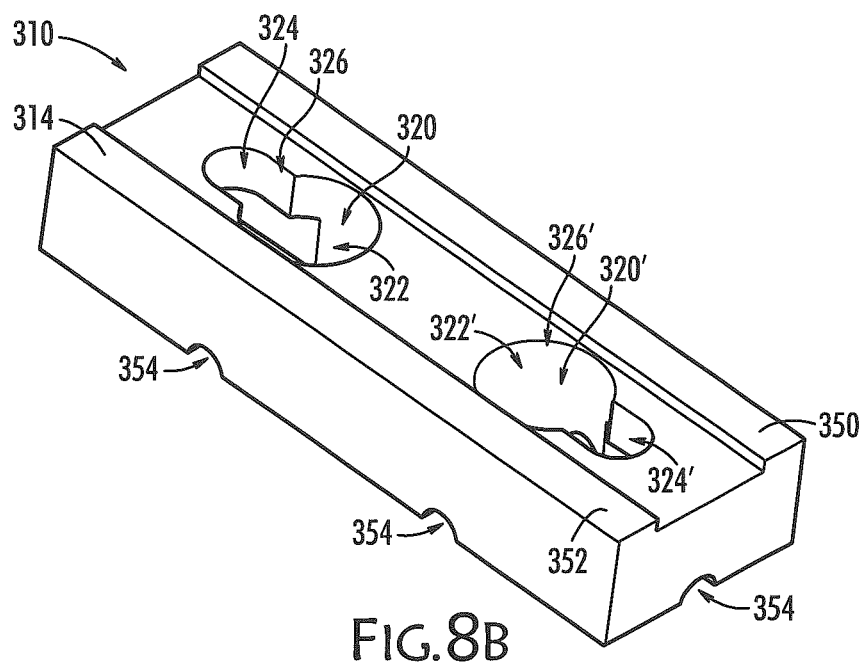
Figure 9B:
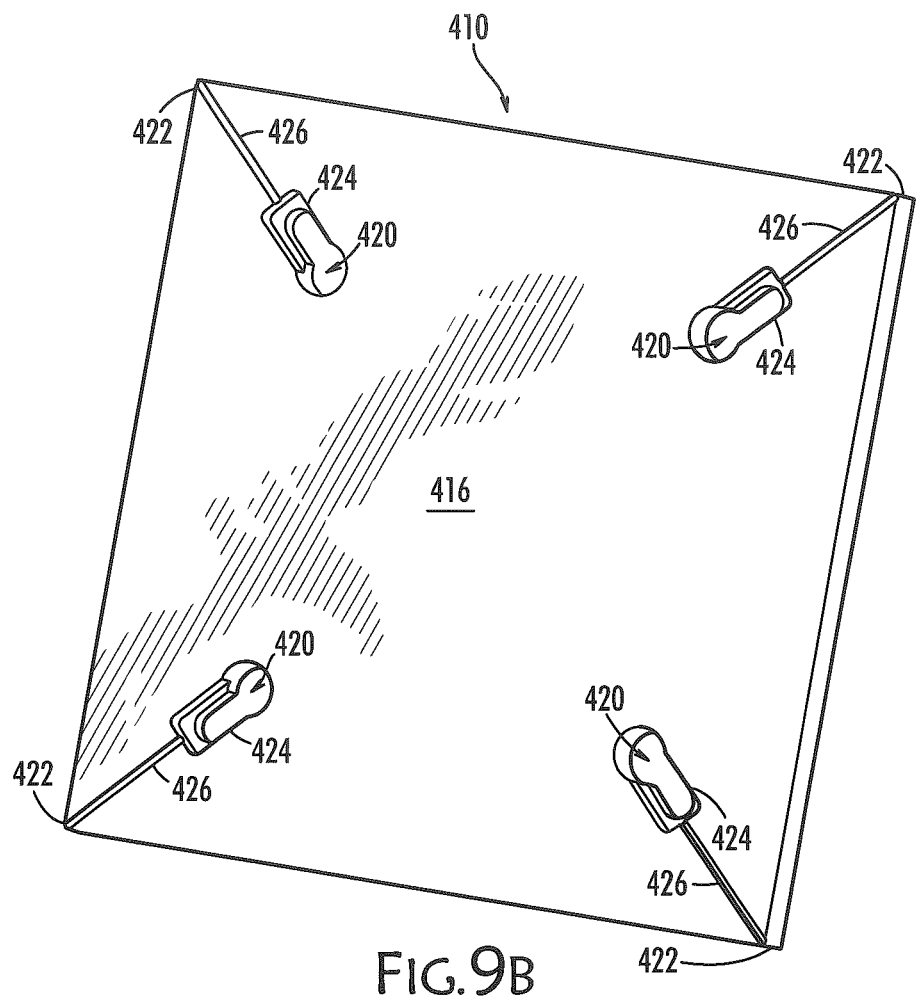
Figure 10:
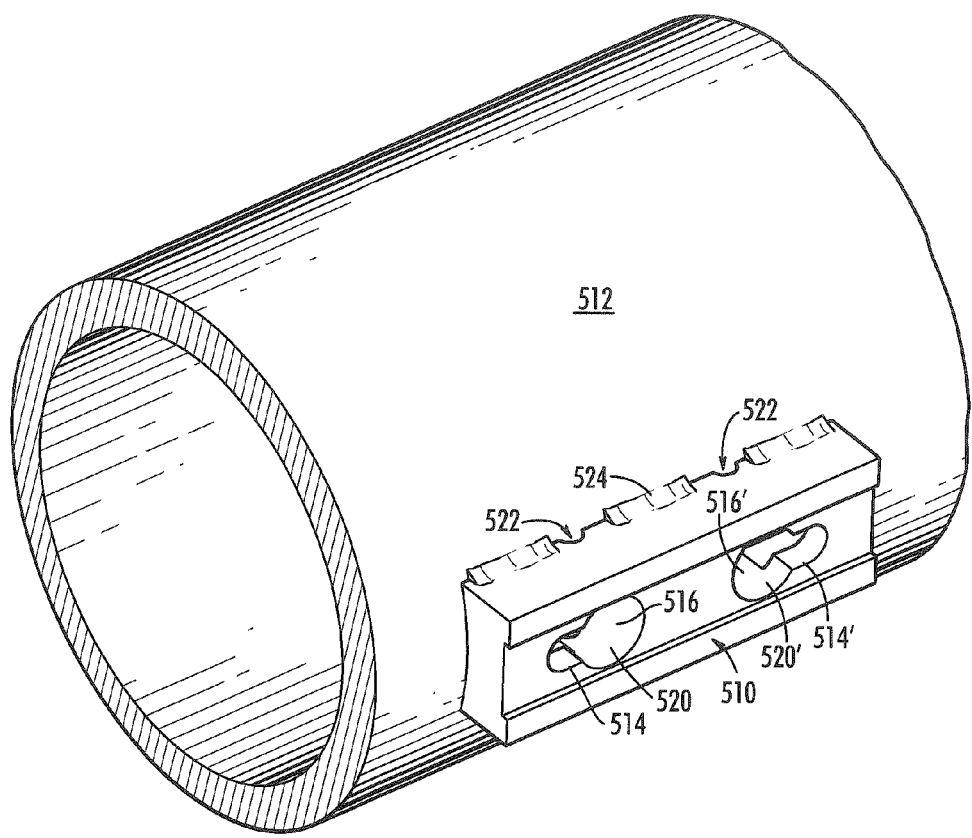
Figure 11:
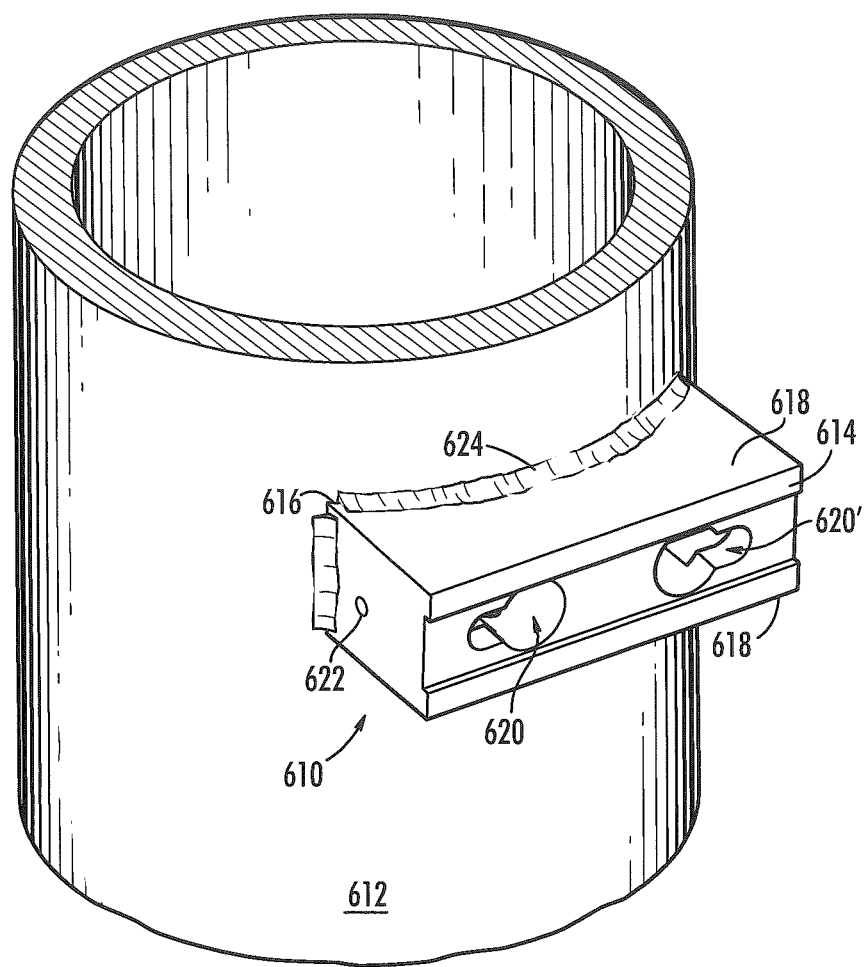

Having thus described variations of the disclosure in general terms, reference will now be made to the accompanying drawings, which are not necessarily drawn to scale, and wherein:

FIGS. 1A and 1B are perspective and exploded perspective views, respectively, showing a weld down base in connection with a single tube clamp and a single bolt, according to an aspect of the disclosure;

FIGS. 2A and 2B are top and bottom perspective views of the weld down base of FIGS. 1A and 1B, according to an aspect of the disclosure;

FIGS. 3A and 3B are perspective and exploded perspective views, respectively, of an aspect of the disclosure showing a weld down base in connection with a double tube clamp and a single bolt, according to an aspect of the disclosure;

FIGS. 4A and 4B are top and bottom perspective views of the weld down base of FIGS. 3A and 3B, according to an aspect of the disclosure;

FIGS. 5A and 5B are perspective and exploded perspective views, respectively, of an aspect of the disclosure showing a weld down base in connection with a single tube clamp and a double bolt, according to an aspect of the disclosure;

FIGS. 6A and 6B are top and bottom perspective views of the weld down base of FIGS. 5A and 5B, according to an aspect of the disclosure;

FIG. 7 is a partially-exploded, perspective view of an aspect of the disclosure showing a weld down base in connection with a single tube clamp and a double bolt, according to an aspect of the disclosure;

FIGS. 8A and 8B are top and bottom perspective views of the weld down base of FIG. 7, according to an aspect of the disclosure;

FIGS. 9A and 9B are perspective top and bottom views of a weld down base for four bolts, according to an aspect of the disclosure;

FIG. 10 is a perspective view of a weld down base similar to that shown in FIGS. 7, 8A and 8B but for attachment to a curved surface, according to an aspect of the disclosure; and FIG. 11 is a perspective view of an alternate weld down base similar to that shown in FIG. 10 but with the curved base oriented 90 degrees with respect to that shown in FIG. 10.

DETAILED DESCRIPTION OF THE DISCLOSURE

The present disclosure concerns a base that enables objects to be supported by a structure to which the base is attached. The present base is, in effect, a coupler, coupling the object to the surface of the supporting structure or coupling a fastener that will hold the object to the surface. The supporting structure may be any surface that has sufficient strength to hold the object that is to be supported, such as a wall, a column, a joist, a beam, or a frame. The base is configured to provide a convenient way for the object to be supported by that base, because the supporting structure has no particular structure to use to attach the object. The base is also a precise device, one that conforms to the surface and that is attached to the supporting surface prior to installation of the object and any mounting fasteners to be used. It is a permanent structure. Attachments to it may be removed and replaced without removing the base. It is designed to use with a wide variety of fasteners, clamps, etc., and is not designed solely for use with particular fastener or object Referring now to FIGS. 1A, 1B, 2A and 2B, there is a base 10 shown with a clamp 12 in FIGS. 1A and 1B, and without a clamp 12 in FIGS. 2A and 2B. Clamp 12 in this example is configured to hold a tube, hose, conduit, pipe or similar object. Other objects may be held by base 10, with and without clamp 12, such as signs, lighting, cameras, mirrors, tanks, fire extinguishers, hoses, monitors, sensors, motors, and countless other objects that are used in commercial and industrial facilities and generally supported off the ground.

Base 10 may be made of any weldable material such as carbon steel, stainless steel, aluminum, aluminum alloys, and titanium alloy and is to be welded to support structure. The support structure must be made of a material compatible with that of base 10 in order for it to be welded to the support structure.

FIGS. 1A and 1B show base 10 with clamp 12 in an assembled view and an exploded view, respectively. Base 10 is shown as a block having a parallelepiped shape, with a top surface 14, a bottom surface 16, and sides 18. The shape of the sides 18 of base 10 is not significant. However, top surface 14 may conform to the object to which base 10 is attached and bottom surface 16 may conform to the support surface to which base 10 is welded, as will be further explained below. Base 10 has a hole 20 formed therein from top surface 14 to bottom surface 16. Hole 20 includes a first portion 22 and a second portion 24 in communication with each other. Together, first portion 22 and second portion 24 have a generally keyhole shape. On top surface 14, at an entrance 26 (FIGS. 1B, 2A, and 2B) to hole 20, second portion 24 of hole 20 is narrower than first portion 22, so as to give hole 20 the keyhole shape when viewing top surface 14 from above.

When viewing bottom surface 16 of base 10 and exit 28 (FIGS. 2A and 2B only) of hole 20 as seen in FIG. 2B, second portion 24 is wider than at entrance 26 and may be the same width as first portion 22. Inside hole 20, in second portion 24, there is a step 30. From step 30 to entrance 26 at top surface 14, second portion 24 is narrower than first portion 22; from step 30 to exit 28 at bottom surface, second portion 24 is wider than at entrance 26.

Clamp 12 may be made of two jaws 32, 34, that grip a cable (not shown) and are securable to base 10 by a bolt 36. Bolt 36 has a head 38 integral with a shaft 40 that carries threads 42 to which nuts 44 can be threaded when bolt 36 is in place in base 10 and in clamp 12, with head 38 near exit 28 of hole 20 and shaft 40 extending through hole 20 of base 10 into holes 46, 48 of jaws 32, 34, respectively, and with nuts 44 threaded to shaft 40. Head 38 is a hexagonal head, a square head, a t-shaped head, or other shape that will be retained in hole 20 of base 10 when nuts 44 are tightened.

For objects such as clamp 12, top surface 14 may be made to conform to the shape of the object it is to hold, such as here, in FIGS. 1A, 1B, where the object is clamp 12. Accordingly, top surface 14 of base 10 is formed to have ridges 50, 52, that help to center jaw 32 between sides 18 and over hole 20.

Channels 54 may be formed on bottom surface to run between hole 20 and sides 18 to provide a passage to allow water that may collect inside hole 20 to drain. Channels 54 function like weep holes to prevent water from accumulating in hole 20.

FIGS. 3A, 3B, 4A and 4B, illustrate another base 110 slightly modified from that of base 10. FIGS. 3A and 3B show base 110 holding a clamp 112 for two cables, rather than one, in an assembled and exploded view, respectively, and, in FIGS. 4A and 4B, which show top and bottom views, respectively, of base 110. Base 110 for the most part has the same shape as base 10, including a top surface 114, a bottom surface 116, and sides 118. Base 110 has a hole 120 formed therein and running from top surface 114 to bottom surface 116. Hole 120 includes a first portion 122 and a second portion 124 in communication with each other. First portion 122 and second portion 124 together have the same keyhole shape as hole 20 of base 10. On top surface 114, at an entrance 126 (FIGS. 3B and 4A only) to hole 120, second portion 124 of hole 120 is narrower than first portion 122. Viewing exit 128 (FIG. 4B only) of hole 120 at bottom surface 116 as seen in FIG. 4B, second portion 124 is wider than at entrance 126 and may be the same width as first portion 122. Inside hole 120, in second portion 124, there is a step 130. From step 130 to entrance 126 at top surface 114, second portion 124 is narrower than first portion 122; from step 130 to exit 128 at bottom surface, second portion 124 is wider than at entrance 126.

FIG. 3A shows clamp 112 may be made of two jaws 132, 134, that grip a pair of spaced-apart cables (not shown) and are securable to base 110 by a bolt 136. Bolt 136 has a head 138 and a shaft 140 with threads 142 to which nuts 144 can be threaded when bolt 136 is in place with head 138 near exit 128 of hole 120 and shaft 140 extends through hole 120 of base 110 into holes 146, 148 of jaws 132, 134, respectively.

Like top surface 14 of base 10, top surface 114 of base 110 is formed to have ridges 150, 152, help to center jaw 132 between sides 118 and over hole 120, but top surface 114 also includes a stop 156 to limit lateral travel of jaw 134.

FIGS. 5A, 5B, 6A and 6B illustrate yet another base with a different clamp, one using two bolts to hold the clamp to a base 210 with a double keyhole. FIGS. 5A and 5B show base 210 holding a clamp 212 in assembled and exploded views, respectively, and, FIGS. 6A and 6B show top and bottom views, respectively, of base 210. Base 210 is somewhat similar to base 10 and base 110. It has a top surface 214 (best seen in FIGS. 5B and 6A, but also identified in FIGS. 5A and 6B), a bottom surface 216 (best seen in FIG. 6B but also identified in FIGS. 5A, 5B, and 6C), and sides 218. Base 210 has a hole 220 formed therein from top surface 214 to bottom surface 216. Hole 220 includes a first portion 222, a second portion 224 in communication with each other but also with a third portion 224' in communication with first and second portions 222, 224. Together, first portion 222 and second portion 224 have the same keyhole shape as hole 20 of base 10, and first portion 222 and third portion 224' also have the same keyhole shape as hole 20 of base 10. On top surface 214, at an entrance 226 to hole 220, second portion 224 and third portion 224' of hole 220 are narrower than first portion 222. Bottom surface 216, viewing exit 228 of hole 220 from below as seen in FIG. 6B, second portion 224 and third portion 224' are wider than at entrance 226 and may be the same width as first portion 222. Inside hole 220, in second portion 224 and third portion 224', there is a step 230, 230', respectively. From step 230, 230' to entrance 226 at top surface 214, second portion 224 and third portion 224' are both narrower than first portion 222; from step 230 and 230' to exit 228 at bottom surface, second portion 224 and third portion 224', respectively, are wider than at entrance 226.

Clamp 212 may be made of two jaws 232, 234, that hold a cable (not shown) and are securable to base 210 by bolts 236, 236'. Bolts 236, 236' have heads 238, 238' and shafts 240, 240' with threads 242, 242' to which nuts 244, 244' can be threaded when bolts 236, 236' are in position, with heads 238, 238' near exit 228 of hole 220 and shaft 240, 240' extending through hole 220 of base 210 into holes in jaw 232 and holes 248, 248' of jaw 234, respectively, as best seen in FIG. 5B.

Top surface 214 of base 210 is formed to have ridges 250, 252, help to center jaw 232 between sides 218 and over hole 220.

Channels 254 may be formed on bottom surface and running between exit 228 of hole 220 to sides 218 to provide a passage to allow water that may collect inside hole 220 to drain. No stop is needed on top surface 214 of base 210 unlike base 110, because lateral movement is only an issue with a single keyhole.

FIGS. 7, 8A, and 8B show yet another weldable base 310 holding a clamp 312. FIG. 7 shows an exploded view and FIGS. 8A and 8B show a bottom and a top view of base 310.

Base 310 uses two bolts to hold clamp 312 to a base 310 with a pair of keyholes 320, 320'. Base 310 is somewhat similar to base 10 and base 210. It has a top surface 314, a bottom surface 316, and sides 318. However, base 310 has two holes 320, 320' formed therein from top surface 314 to bottom surface 316. Holes 320, 320' include a first portions 322, 322' and a second portions 324, 324' in communication with each other and in communication with first portions 322, 322', respectively. Together, holes 320, 320' have the same keyhole shapes as hole 20 of base 10. On top surface 314, at an entrance 326, 326' to hole 320, 320', respectively, second portions 224, 224' are narrower than first portions 322, 322'. At bottom surface 316, viewing exits 328, 328' of holes 320, 320', respectively, from below as seen in FIG. 8A, second portions 324, 324' are wider than at entrance 326, 326' and may be the same width as first portion 322, 322'. Inside holes 320, 320', in second portions 324 324', there are steps 330, 330', respectively. From step 330, 330' to entrances 326, 326' at top surface 314, second portions 324, 324' are narrower than first portions 322, 322', respectively; from steps 330 and 330' to exits 328, 328' at bottom surface, second portions 324, 324' respectively, are wider than at entrances 326, 326'.

Clamp 312 may be made of two jaws 332, 334, that grip a pipe (not shown) and are securable to base 310 by bolts 336, 336'. Bolts 336, 336' have heads 338, 338' and shafts 340, 340' with threads (not shown in FIG. 6B but similar to threads 242, 242' of FIG. 5B), respectively, to which nuts 344, 344' can be threaded when bolts 336, 336' are in place with heads 338 near exit 328 of hole 320 and shafts 340, 340' extend through hole 320 of base 310 into holes (not visible in FIG. 6B but similar to the holes 246, 246' in jaw 232 of FIG. 5B) and 348, 348' of jaws 332, 334, respectively.

Top surface 314 (FIGS. 7 and 8B) of base 310 is formed to have ridges 350, 352, help to center jaw 332 between sides 318 and over holes 320, 320'.

Channels 354 may be formed on bottom surface and running between exits 328, 328' (FIG. 8A) of holes 320, 320' to sides 318 to provide a passage to allow water that may collect inside hole.

Again no stop is needed in base 310, unlike base 110, because lateral movement is prevented by the opposing orientation of holes 320, 320'.

FIGS. 9A and 9B show the top surface 414 and bottom surface 416, respectively, of a plate base 410 with sides 418 and four holes 420. Each hole 420 has a keyhole shape identical to that of bases 10, 110, and base 310. Holes 420 are deployed to the corners 422 of plate 410 with smaller portion 424 oriented toward corners 422. In FIG. 9B, channels 426 run from holes 420 to corners 422 to drain water that would otherwise collect in holes 420.

FIG. 10 shows a base 510 welded to a cylindrical column or pipe 512. Base 510 is identical to base 410 of FIGS. 7, 8A, and 8B, except that its bottom side is curved to match the curvature of pipe 512. Note that by orienting the smaller portions 514, 514' of keyhole openings 520, 520' in opposing directions, it is less likely that an object fastened to base 510 will come loose: at no time will the heads of bolts both be aligned with the wider portions 516, 516' of openings 520, 520'. Note also that welding of base 510 to pipe 512 may be done so as to leave channels 522 open between weldments 524.

FIG. 11 illustrates a portion of a cylindrical column 612 with a base 610 attached thereto. Base 610 is shown rotated by 90 degrees with respect to column 612 compared to base 510 in FIG. 10, and the curve of bottom surface 616 of base 610 conforms to the curvature of column 612. Its top surface 614 and most of the features of base 610 are similar to base 310 in FIGS. 7 and 8A except that, because of the curvature of its bottom surface 616, drain holes 622 are provided in lieu of channels 354 and which run from hole 620 to sides 618 through base 610 in a manner that does not interfere with weldments 624.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. A device, comprising,
   a clamp having a hole formed therein;
   a bolt having a head and a shaft, said shaft carrying threads;
   a nut having threads; and
   a base having a top surface and a bottom surface, sides, and a hole in said base running from said top surface to said bottom surface, said hole of said base defining an entrance at said top surface and an exit at said bottom surface, said hole of said base having a first portion and a second portion in communication with said first portion, said first portion of said hole of said base being wider than said second portion, said hole of said base having a step located between said entrance and said exit at said second portion, said head of said bolt fitting in said first portion below said step but not fitting in said first portion above said step so that said head of said bolt does not pass through said hole of said base from said exit of said second portion to said entrance of said second portion of said base, and
   wherein said shaft of said bolt extends from said exit of said hole of said base through said entrance of said hole of said base and through said hole of said clamp, wherein said clamp is held to said base when said head of said bolt is below said step of said second portion of said hole and said shaft of said bolt extends above said step of said base and said nut is threaded to said shaft of said bolt so as to secure said head of said bolt against said step of said second portion.

2. The device of claim 1, wherein said bottom surface of said base is curved.

3. The device of claim 1, further comprising a channel running at said exit of said hole of said base to said sides of said base.

4. The device of claim 1, wherein said top surface has opposing spaced-apart ridges with said hole between said spaced apart ridges.

5. The device of claim 1, wherein said top surface includes a stop proximate to said first portion of said hole.

6. A device, comprising,
   a clamp having at least one hole formed therein;
   at least one bolt, said at least one bolt having a head and a shaft, said shaft carrying threads;
   at least one nut having threads and threadably receivable on said shaft of said bolt; and
   a base having a top surface and a bottom surface, sides, and at least one hole in said base running from said top surface to said bottom surface, said at least one hole in said base defining an entrance at said top surface and an exit at said bottom surface, said at least one hole in said base having a first portion and a second portion in communication with said first portion, said first portion of said at least one hole in said base being wider than said second portion, said at least one hole in said base having a step located between said entrance and said exit at said second portion, said head of said at least one bolt fitting in said first portion below said step but not fitting in said first portion above said step so that said head of said at least one bolt does not pass from said exit of said second portion to said entrance of said second portion of said base, and
   wherein said shaft of said at least one bolt extends from said exit of said at least one hole of said base through said entrance of said at least one hole of said base and through said at least one hole of said clamp and wherein said clamp is held to said base when said head of said at least one bolt is below said step of said second portion of said at least one hole of said base and a nut of said two nuts is threaded to said shaft of said at least one bolt so as to secure said head of said at least one bolt against said step of said second portion.

7. The device of claim 6, wherein said at least one hole of said base is two holes.

8. The device of claim 6, wherein said at least one hole of said base is four holes.

9. The device of claim 6, wherein said at least one bolt is four bolts.

10. The device of claim 6, wherein said base is curved.

11. The device of claim 6, wherein said top surface includes a stop proximate to said first portion of said at least one hole of said base.

12. The device of claim 6, further comprising at least one channel running from said exit of said at least one hole of said base to said sides of said base.

13. The device of claim 6, wherein said top surface has opposing spaced-apart ridges with said hole between said spaced apart ridges.

\* \* \* \* \*

UNITED STATES PATENT AND TRADEMARK OFFICE
CERTIFICATE OF CORRECTION

PATENT NO. : 9,670,949 B1
APPLICATION NO. : 14/816428
DATED : June 6, 2017
INVENTOR(S) : Thomas C. White et al.

It is certified that error appears in the above-identified patent and that said Letters Patent is hereby corrected as shown below:

In the Drawings

Replacement Drawing Sheet 2/12 is attached. In Fig. 1B, 54 has now been included along with a lead line to the channel as shown on page 2 of 2

In the Specification

Column 5, Line 47 should be corrected to read as follows:
but also identified in FIGS. 5A, 5B, and 6A), and sides 218. Base Column 6, Lines 45-54 should be corrected to read as follows:
Clamp 312 may be made of two jaws 332, 334, that grip a pipe (not shown) and are securable to base 310 by bolts 336, 336'. Bolts 336, 336' have heads 338, 338' and shafts 340, 340' with threads (not shown in FIG. 7 but similar to threads 242, 242' of FIG. 5B), respectively, to which nuts 344, 344' can be threaded when bolts 336, 336' are in place with heads 338 near exit 328 of hole 320 and shafts 340, 340' extend through hole 320 of base 310 into holes (not visible in FIG. 7 but similar to the holes 246, 246' in jaws 232, 234 of FIG. 5B) and holes 348, 348' of jaws 332, 334, respectively.

Column 7, Line 7 should be corrected to read as follows:
or pipe 512. Base 510 is identical to base 310 of FIGS. 7, 8A, Signed and Sealed this
Seventh Day of November, 2017

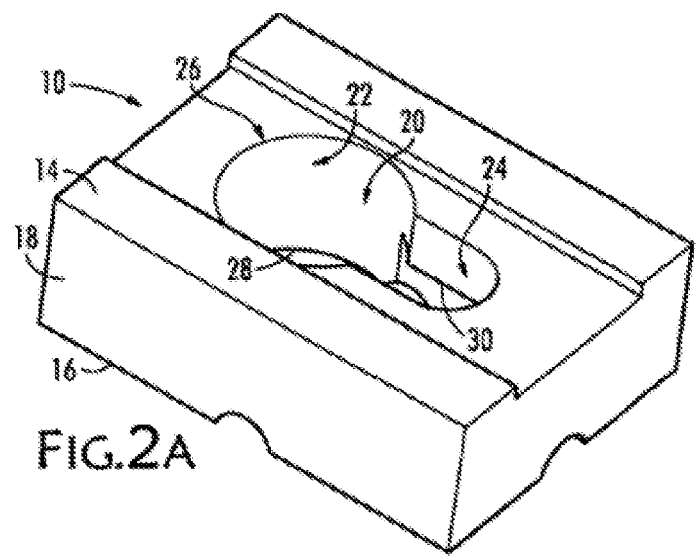
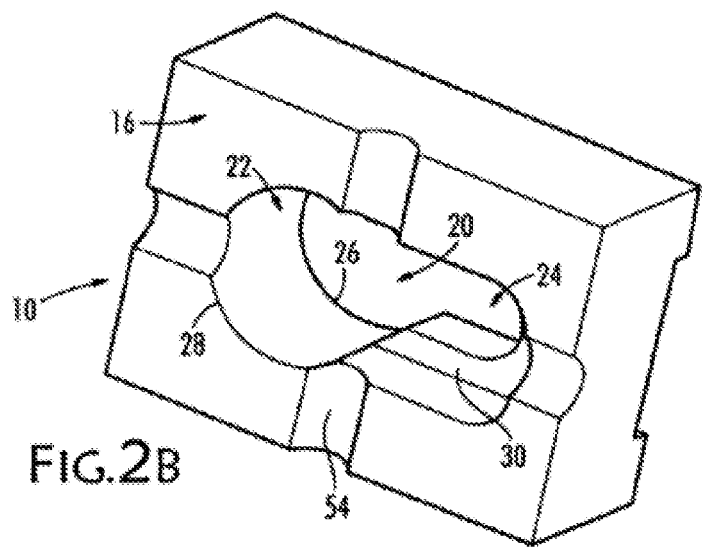

Joseph Matal
*Performing the Functions and Duties of the
Under Secretary of Commerce for Intellectual Property and
Director of the United States Patent and Trademark Office*